United States Patent [19]
Brandhofer et al.

[11] Patent Number: 6,059,966
[45] Date of Patent: May 9, 2000

[54] CARTRIDGE FILTER WITH FRAME

[75] Inventors: Andreas Brandhofer, Birkenau; Matthias Schuster, Absteinach; Hans-Joachim Lippold, Berlin; Jörgen Knudsen, Angelbachtal; Margit Hofmann, Gorxheimertal, all of Germany

[73] Assignee: Firma Carl Fredenberg, Weinheim, Germany

[21] Appl. No.: 09/033,493

[22] Filed: Mar. 2, 1998

[30] Foreign Application Priority Data

Mar. 18, 1997 [DE] Germany .......................... 197 11 280

[51] Int. Cl.[7] .................................................. G01D 46/42
[52] U.S. Cl. ........................... 210/232; 210/485; 55/496; 55/503
[58] Field of Search .................................... 210/232, 485, 210/483; 55/496, 503

[56] References Cited

U.S. PATENT DOCUMENTS

| | | | |
|---|---|---|---|
| 813,727 | 2/1906 | Marquardt | 55/496 |
| 1,122,437 | 12/1914 | Sweeney | 55/496 |
| 2,175,903 | 10/1939 | Lichtman | 55/496 |
| 2,565,698 | 8/1951 | Patterson | 55/496 |
| 3,252,580 | 5/1966 | Getzin | 210/485 |
| 3,280,984 | 10/1966 | Sexton et al. | 210/485 |
| 3,392,846 | 7/1968 | Getzin | 210/485 |
| 3,478,498 | 11/1969 | Sauermann | 210/485 |
| 5,188,646 | 2/1993 | Nolen, Jr. | 55/496 |
| 5,476,526 | 12/1995 | Attermeyer | 55/496 |

FOREIGN PATENT DOCUMENTS

| | | |
|---|---|---|
| 351682 | 1/1990 | European Pat. Off. . |
| 195 02 366 | 8/1996 | Germany . |
| 2211110 | 6/1989 | United Kingdom . |

Primary Examiner—Christopher Upton
Attorney, Agent, or Firm—Kenyon & Kenyon

[57] ABSTRACT

A cartridge filter has a filter element and a frame formed of plates. The plates are installable around the filter element and are interconnectable in the area of the sides of the plates. The plates have plug-in connection members which interact with corresponding plug-in connection members of adjacent plates to thereby affix the plates to one another.

17 Claims, 5 Drawing Sheets

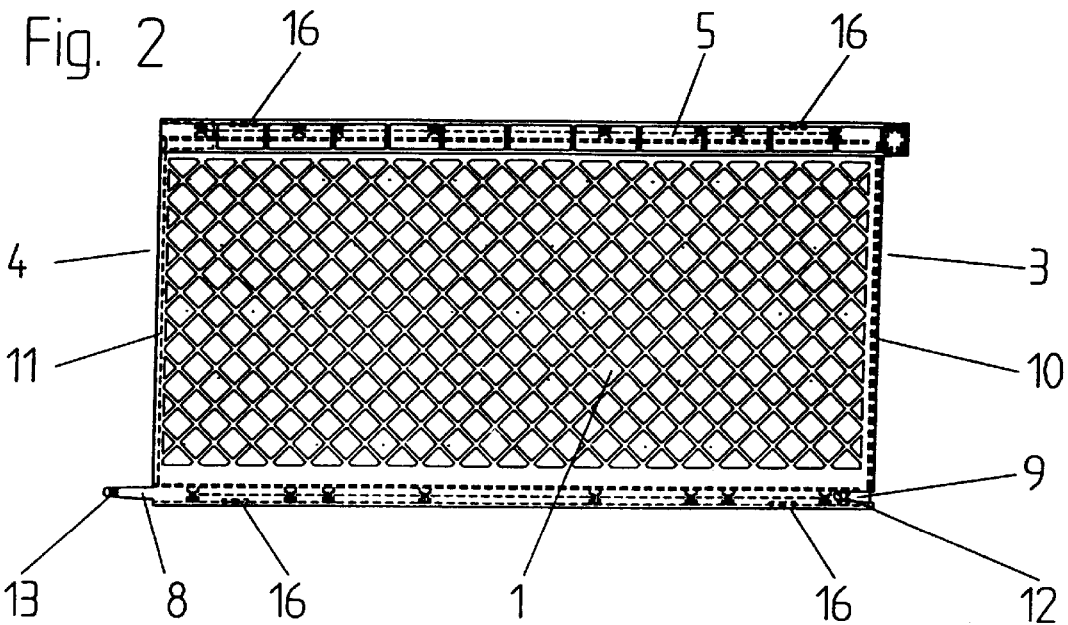
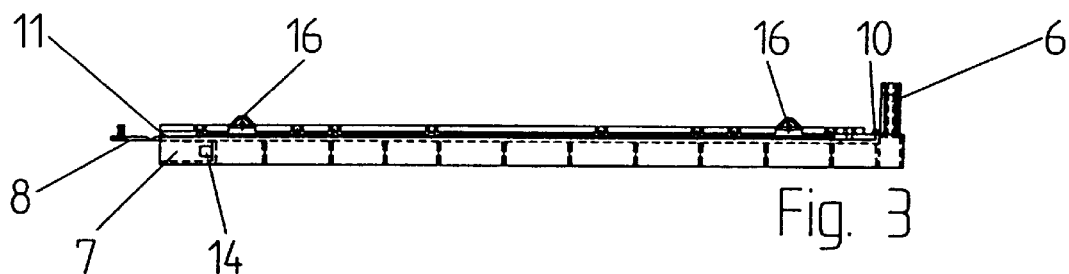
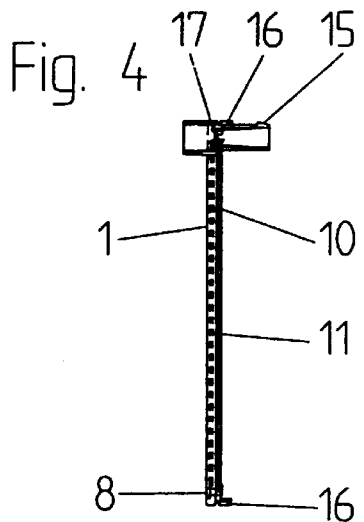
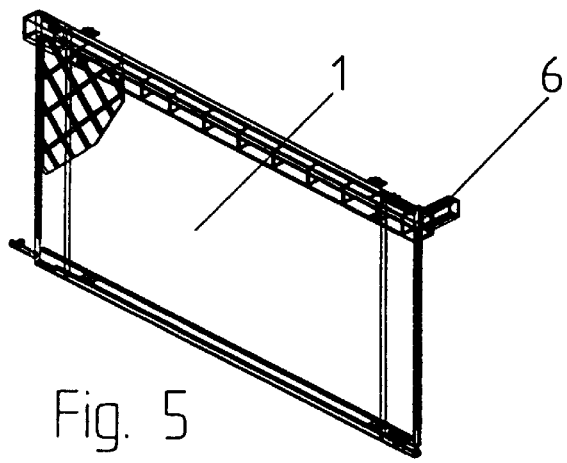

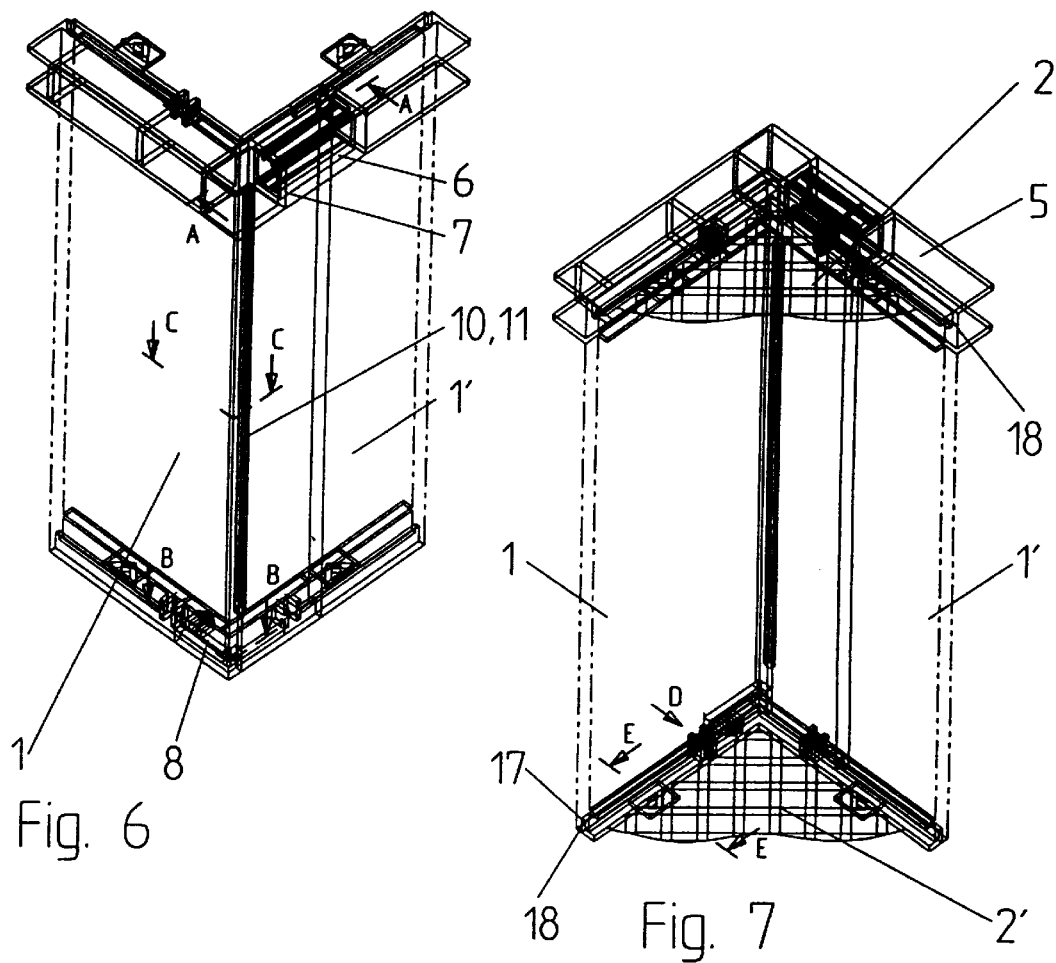
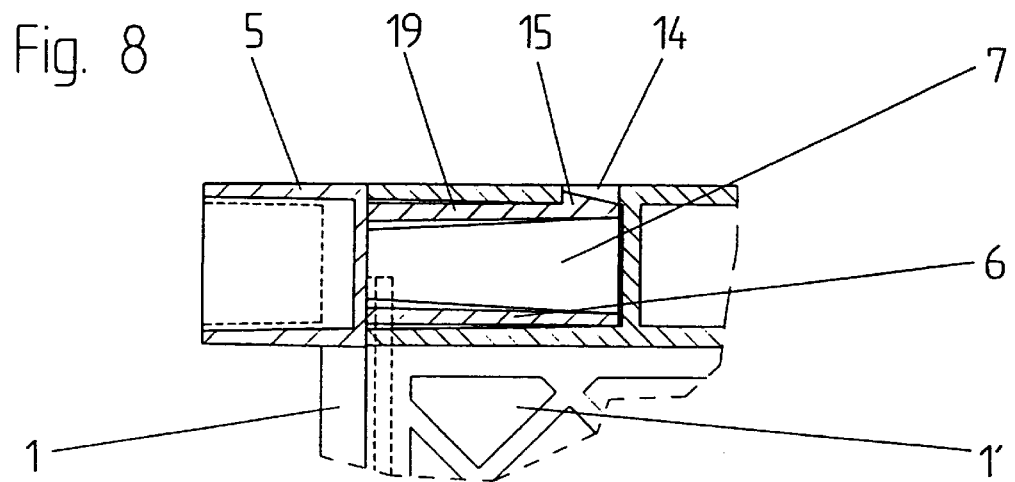

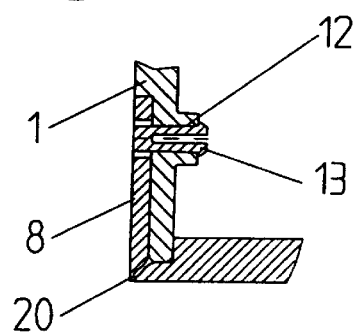
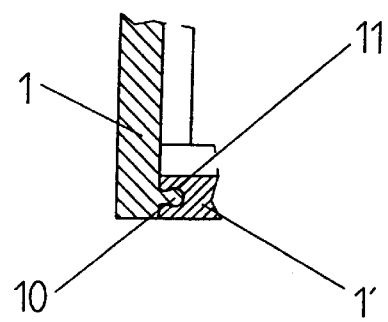
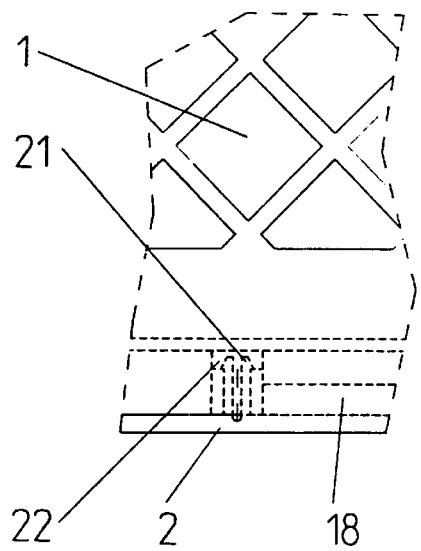
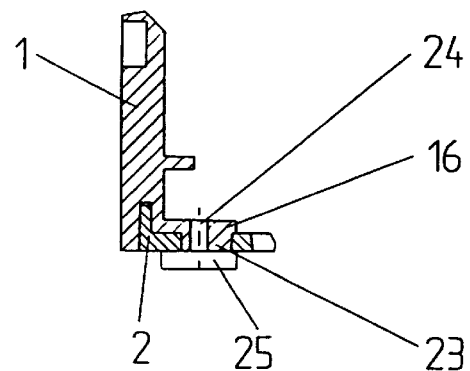

CARTRIDGE FILTER WITH FRAME

FIELD OF THE INVENTION

Cartridge filters are used for constructing filtering installations. In so doing, the filter elements are arranged in a frame or box to assure the sealing and supporting function, as well as easy interchangeability.

BACKGROUND OF THE INVENTION

DE-OS 195 02 366, which discloses a cartridge filter having a pleated filter element and a frame composed of plates, is incorporated herein by reference for these teachings. The plates are arranged around the lateral surfaces of the filter element and are joined together in the area of their ends by an adhesive layer. Another adhesive layer is provided to affix the filter pack to the plates in a dust-tight manner.

A cartridge filter of this kind is assembled such that the plates forming the box are glued in succession to the filter element and finally bonded to one another. In so doing, the plates must be positioned exactly to achieve a clean bonding.

SUMMARY OF THE INVENTION

The object of the invention is to so simplify the production of a cartridge filter such that it is possible to dispense with costly positioning and retaining devices, as well as adhesive agents or other separate bonding means.

The present invention provides a cartridge filter having a filter element and a frame formed of plates, the plates being installable around the filter element and being interconnectable in the area of their sides. The plates have plug-in connectors which interact with corresponding plug-in connectors of adjacent plates and affix the plates to one another.

In contrast to the known bonded fame, the assembly is markedly simplified, since no application or hardening time of adhesive is necessary.

Advantageously, each plug-in connection comprises at least one projection which is arranged on a first plate and may be forced into engagement with a cavity of a second plate. The projection may extend toward the second plate. The projection of a plate is bent with respect to the plate, for example, by approximately 90°, and extends toward the second plate.

Furthermore, advantageously the plates form a top frame and/or base flame in the area of the plug-in connection. It is thereby possible to accommodate the plug-in connection in a space-saving manner without increasing the dimensions typically used.

If the plates are of matching length and shape, the frame can be produced from a single basic element.

In addition to the plug-in connection, a catching mechanism or clasp with interlocking parts can be employed. The catching mechanism can be releasable or permanent. The individual plates are mutually supported in this manner.

Furthermore, in place of or in addition to the plug-in connection, it is possible to provide lugs that fold over. Lugs may be particularly useful in the area further from the plug-in connection.

To further improve the mechanical cohesion, an interlocking ridge and groove connection can be provided along the contact line of two plates.

To further reinforce the frame of the cartridge filter, a protective grating can be provided which joins the plates, at least in the area of an end face of the filter element. In this manner, the filter element is protected from mechanical contacts during the installation.

The protective grating and the plate are expediently affixed to one another by a detent connection.

To seal the filter element vis-a-vis the plates of the cartridge-filter frame, it is advantageous if the filter element abuts against the plates under prestressing.

Expediently, sealing strips may be inserted between the filter element and the plates. It is also possible to provide sealing mats covering the inner side of the plates. The purpose of these sealing elements is to ensure dust-proof sealing. In this context, understood by these sealing elements is also a layer of adhesive. Here, a bracing would not be necessary.

To affix the filter element in its spatial position in the frame, the plates can overlap the filter element with a bar in the region of one end face of the filter element.

Furthermore, an assembly kit is proposed for producing a cartridge filter which has a block-shaped pleated-filter element and four matching plates that may be affixed to one another by a plug-in connection and may be pressed sealingly with the pleated-filter element.

BRIEF DESCRIPTION OF THE DRAWINGS

A cartridge filter according to the invention is pictured in several variants in the drawings, in which:

FIG. 2 is a side view of a plate of the cartridge filter of FIG. 1;

FIG. 3 is a top view of the plate of FIG. 2:

FIG. 4 is an end view of the plate of FIG. 2;

FIG. 5 is a perspective view of the plate of FIG. 2;

FIG. 6 is a perspective view from the outside of a detail drawing of the corner joining of two plates;

FIG. 7 is a perspective view from the inside of the detail drawing of the corner joining of two plates;

FIG. 8 is an enlarged section view of an intersection along the line A—A of FIG. 6;

FIG. 9 is an enlarged section view along line B—B of FIG. 6;

FIG. 10 is an enlarged section view along line C—C of FIG. 6;

FIG. 11 is an enlarged side view along line D of FIG. 7 with regard to the grip-type protective fastening;

FIG. 12 is an enlarged section view along line E—E of FIG. 7 with regard to the grip-type protective detent;

DETAILED DESCRIPTION OF THE INVENTION

Figure 1:
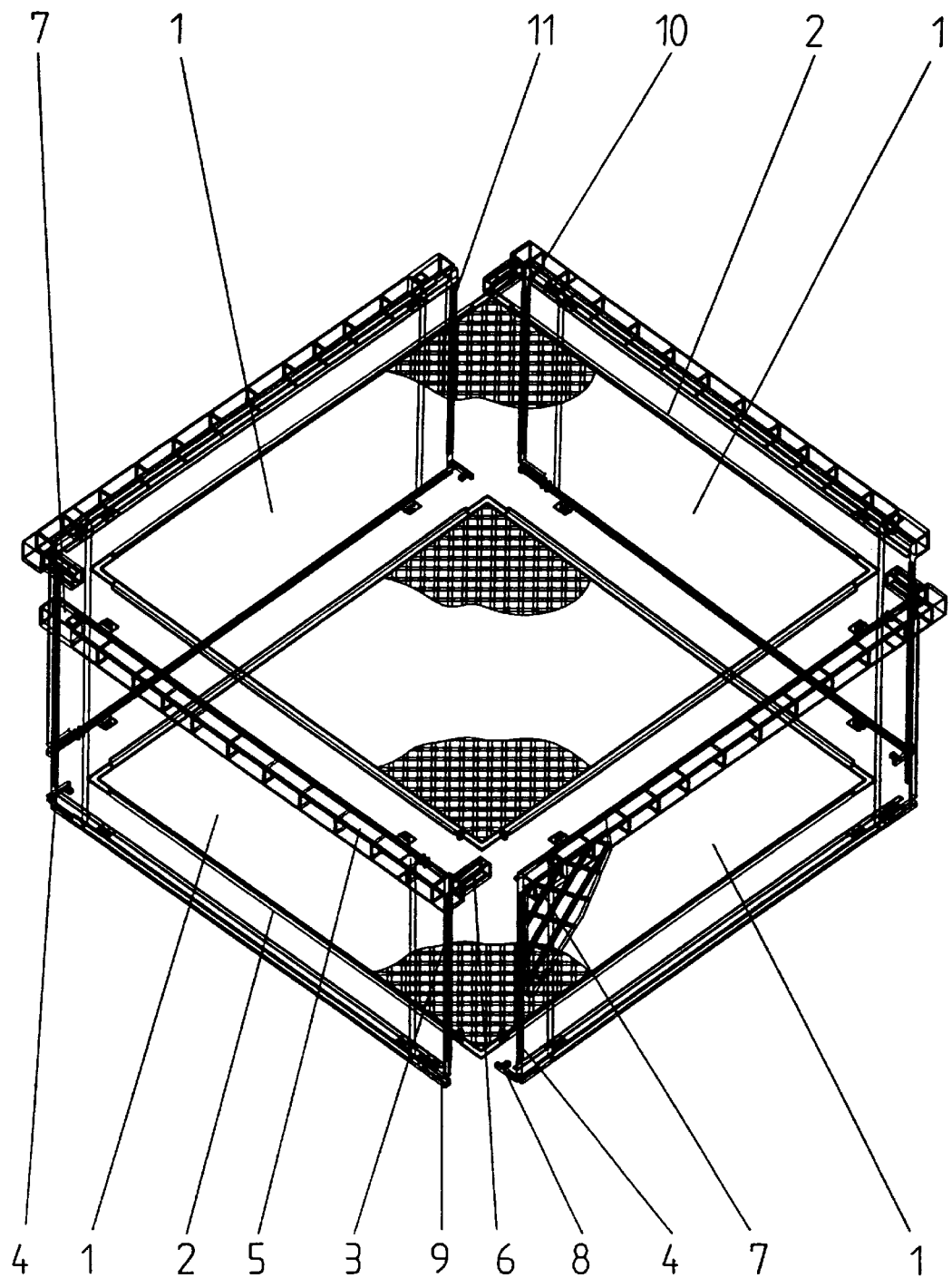
FIG. 1 is an exploded perspective view of a cartridge filter with a protective grating according to the present invention.

The cartridge filter shown in FIG. 1 is comprised of four plates 1, which are assembled to form a rectangular or quadratic box frame and are arranged around a pleated-filter element (not shown). To protect the pleated-filter element enclosed by plates 1, protective gratings 2 are arranged on the end faces of the frame formed by plates 1, thus there are two protective gratings altogether.

Each plate 1 is joined at two opposite sides 3 with the respective adjacent plate 1. The connection is effected by the use of various means which are independent of one another.

Plate 1 has a top frame 5 which extends between sides 3 and 4 over the entire width of plate 1 (see FIG. 2). In the region of a side 3, the top frame 5 has a projection 6 which sticks out at an angle of 90° from the plate and forms a plug-in connection with a receiving space 7 disposed on opposite side 4. Another plug-in connection is produced by an inclinable lug 8 arranged on side 4. The lug 8 may be forced into engagement with a corresponding opening or receiver 9 in the region of side 3. Finally, a third plug-in connection is provided which extends along the contact line of two adjacent plates 1 and is comprised of a ridge or protuberance 10 on one plate and a complementary shaped interlocking groove 11 on the other plate.

The lateral view of the plate according to FIG. 2 clarifies the arrangement of lug 8 and receiver 9 in the area of sides 3, 4. Plate 1 is provided with a cutout 12 which is forced into engagement with a projection 13 of an adjacent lug 8. In addition, provided at sides 3, 4 are elongated protuberances 10 and corresponding recesses 11 extending over almost the entire side, whose interplay is further apparent in FIG. 3.

FIG. 3 shows projection 6 arranged in the top frame 5, as well as the corresponding receiving space 7. The receiving space 7 is provided with an interlock opening 14 which can be engaged with clasp element 15, shown in FIG. 4.

On its side facing the space to be enclosed, the top frame 5 has supports 16 which can be used for the protective grating 2. The support 16 may, for example, allow for the use of a releasable fastening, such as screws, to be used to secure the protective grate to it (see FIG. 12). The support 16 is also located in the base region of plate 1. Furthermore, in top frame 5 and in the base region, plate 1 has a guide groove 17 with which ribs of the protective grating engage.

The interlocking elements at the side are also shown in FIG. 4, namely lug 8 as well as elongated protuberance 10 and recess 11, which are staggered relative to each other in the spatial plane.

In FIG. 5 the plate 1 is depicted in perspective view showing particularly projection 6 in its spatial position with respect to plate 1.

FIG. 6 shows an outside view of a corner of the frame for a cartridge filter formed by assembling two plates 1, 1'. Lugs 8 are shown bent around the corner, and projection 6 is shown forced into engagement with receiving space 7. In addition, elongated protuberance 10 is inserted into recess 11, so that there is a secure connection along the sides of the plates.

In FIG. 7, the view of the corner from FIG. 6 is shown from the inside, two protective gratings 2, 2' having been mounted. Protective gratings 2, 2' are provided with ribs 18 which come to lie in guide groove 17 in top frame 5 and the base region, respectively, of plate 1.

Shown enlarged in FIG. 8 is the plug-in connection of two adjacent plates 1, 1' by way of projection 6 and receiving space 7. Clasp element 15 on projection 6 engages with opening 14 forming a positive locking. During assembly, limb 19 bearing clasp element 15 is pressed, in order to spring back upon reaching opening 14 and effect an engagement.

FIG. 9 shows an enlargement of the plug-in connection by means of lugs 8. Lug 8 is bent over by 90° toward plate 1 using a film hinge 20 and engages in the area of cutout 12 under projection 13.

FIG. 10 shows the plug-in connection along sides 3, 4. The protuberance 10 of plate 1 is pressed into recess 11 of plate 1'. A connection with positive locking is formed by this means.

FIG. 11 shows the fastening of protective grating 2 in the base region of plate 1. Rib 18 is provided with a projection clasp 21 which engages with a recess 22. FIG. 12 shows the attachment mechanism of protective grating 2. Plate 1 is provided with a support 16 which projects by way of a conical extension prolongation 23 through protective grating 2. Located in support 16 and extension prolongation 23 is a through opening 24 into which a screw can be screwed into place. Protective grating 2 is safeguarded by an appropriate design of screw head 25 from unintentional removal.

Figures 13, 14:
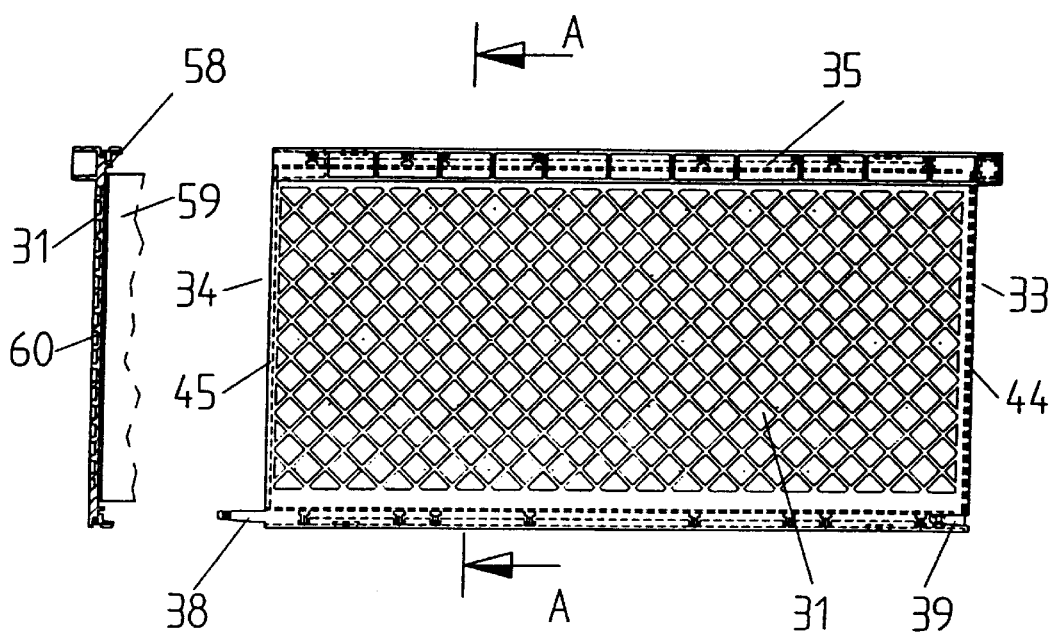
FIG. 13 is a side view of another plate with an additional connection in the base region.
FIG. 14 is a section view along line A—A of FIG. 13.

FIG. 13 shows a corresponding plate 31 provided with a top frame 35 having the connection mechanisms as discussed above. Here, a lug 38 is arranged in the base region which can be forced into engagement with a receiver 39 of the adjacent plate. A ridge or elongated protuberance 44 and a recess 45, respectively, extend along sides 33, 34 and provide mechanical stability along the entire sides.

Provided in FIG. 14 are bars 58 which overlap the pleated filter element 59 at least partially. By this means, the pleated-filter element is spatially fixed in its position. A sealing element 60 can be arranged between pleated-filter element 59 and plate 31. The sealing element 60 can be partially compressed during assembly of the plates thus producing a sealing force.

Figure 15:
FIG. 15 is a top view of the plate of FIG. 13.

In FIG. 15, lug 38 is shown in two different positions. Starting from lug 38 extending along unmounted plate 31, lug 38' has been swiveled by 90° toward the inner side of plate 31, a film hinge 42 facilitating the swivel. Lug 38 is provided with a projection 43 which is forced into engagement with a corresponding receiver on the adjacent plate.

In the case of a base frame, instead of lug 38, a further plug-in connection can also be formed corresponding to projection 6 and receiving space 7.

What is claimed is:

1. A cartridge filter, comprising:
   a filter element; and
   a frame comprising a first plate and a second plate, the first and second plates being installable around the filter element and being interconnectable in the area of a side of the first plate and a side of the second plate, wherein the first plate has at least one plug-in connection mechanism which interacts with at least one plug-in connection mechanism of the second plate to thereby affix the first plate to the second plate and further wherein when the plug-in connection mechanisms are mated together, the interaction of the plug-in connection mechanisms fixes the relative position of the first and second plate.

2. The cartridge filter as defined by claim 1, wherein the at least one plug-in connection mechanism of the first plate comprises at least one projection of the first plate which may be engaged with a cavity of the second plate.

3. The cartridge filter as defined by claim 2, wherein the at least one projection extends toward the second plate.

4. The cartridge filter as defined by claim 1, wherein the first and second plates, in the area of the at least one plug-in connection mechanism, are formed as top frames.

5. The cartridge filter as defined by claim 1, wherein the first and second plates, in the area of the at least one plug-in connection mechanism, are formed as base flames.

6. The cartridge filter as defined by claim 1, wherein the first and second plates are of matching length and shape.

7. The cartridge filter as defined by claim 1, wherein the at least one plug-in connection mechanism of the first plate includes an interlocking opening and the at least one plug-in connection mechanism of the second plate includes a latch member for engaging the interlocking opening.

8. The cartridge filter as defined by claim 1, wherein the at least one plug-in connection mechanism of the first plate includes a protuberance running along the side of the first plate and the at least one plug-in connection mechanism of the second plate includes a groove running along the side of the second plate, the groove adapted to receive the protuberance therein.

9. The cartridge filter as defined by claim 1, wherein the connection is safeguarded by a protective grating which joins the first and second plates at least in the area of an end face of the filter element.

10. The cartridge filter as defined by claim 9, wherein the protective grating includes a projection clasp and the first plate includes a recess, the protective grating and the first plate being held together at least in part by interlocking the projection clasp and the recess.

11. The cartridge filter as defined by claim 9, wherein the protective grating includes a recess and the first plate includes a projection clasp, the protective grating and the first plate being held together at least in part by interlocking the projection clasp and the recess.

12. The cartridge filter as defined by claim 1, wherein the filter element abuts against the first and second plates under prestressing.

13. The cartridge filter as defined by claim 12, wherein the plates are pressed sealingly with the filter element.

14. The cartridge filter as defined by claim 1, wherein a sealing element is inserted between the filter element and the first and second plates.

15. The cartridge filter as defined by claim 1, wherein the first and second plates overlap the filter element with a bar at least in the area of an end face of the first plate.

16. A cartridge filter, comprising:
   a filter element; and
   a frame comprising a first plate and a second plate, the first and second plates being installable around the filter element and being interconnectable in the area of a side of the first plate and a side of the second plate, wherein the first plate has at least one plug-in connection mechanism which interacts with at least one plug-in connection mechanism of the second plate to thereby affix the first plate to the second plate,
   wherein at least one plug-in connection mechanism of the first plate comprises an inclinable lug, and the at least one plug-in connection mechanism of the second plate comprises a lug opening for receiving the inclinable lug.

17. The cartridge filter as defined by claim 16 wherein the inclinable lug includes a film hinge disposed adjacent to the first plate, the film hinge being operable to facilitate an angular re-orientation of the inclinable lug.

* * * * *